(12) United States Patent
Albrecht et al.

(10) Patent No.: US 7,466,506 B1
(45) Date of Patent: *Dec. 16, 2008

(54) MAGNETIC RECORDING DISK DRIVE WITH HEAD POSITIONING SERVO CONTROL SYSTEM FOR DISK SURFACES WITH IDENTICAL SERVO PATTERNS

(75) Inventors: Thomas R. Albrecht, San Jose, CA (US); Zvonimir Z. Bandic, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/765,335

(22) Filed: Jun. 19, 2007

(51) Int. Cl.
*G11B 15/12* (2006.01)
*G11B 5/596* (2006.01)
(52) U.S. Cl. .................. 360/63; 360/61; 360/78.08; 360/78.14
(58) Field of Classification Search .............. None
See application file for complete search history.

(56) References Cited

U.S. PATENT DOCUMENTS

| | | | |
|---|---|---|---|
| 4,912,585 A | 3/1990 | Belser et al. | |
| 5,689,384 A | 11/1997 | Albrecht et al. | |
| 5,771,126 A * | 6/1998 | Choi | 360/49 |
| 5,923,272 A | 7/1999 | Albrecht et al. | |
| 5,930,065 A | 7/1999 | Albrecht et al. | |
| 6,018,512 A * | 1/2000 | Belser | 369/281 |
| 6,347,016 B1 | 2/2002 | Ishida et al. | |
| 6,433,944 B1 | 8/2002 | Nagao et al. | |
| 6,538,835 B1 * | 3/2003 | Burton | 360/63 |
| 6,791,774 B1 | 9/2004 | Albrecht et al. | |
| 6,798,590 B2 | 9/2004 | Albrecht et al. | |
| 7,061,702 B2 | 6/2006 | Yoshimura et al. | |
| 7,092,183 B2 | 8/2006 | Ehrlich | |

(Continued)

OTHER PUBLICATIONS

Ishida, T. et al., "Magnetic Printing Technology-Application to HDD", IEEE Transactions on Magnetics, vol. 39, No. 2, Mar. 2003, pp. 628-632.

(Continued)

*Primary Examiner*—Jason C Olson
(74) *Attorney, Agent, or Firm*—Thomas R. Berthold

(57) ABSTRACT

A magnetic recording disk drive has disks with identical pre-patterned servo patterns on their front and back surfaces and a servo control system for positioning the read/write heads using the servo signals from the identical servo patterns. The servo sectors on the two disk surfaces form identical patterns of angularly spaced arcuate-shaped lines that extend generally radially across the data tracks. The arcuate-shaped lines on one surface, the front surface, generally replicate the path of the recording head as it is moved across the data tracks by a rotary actuator, so that there is a constant sampling rate of the servo sectors on the front surface regardless of radial position of the head. However, the arcuate-shaped lines on the other surface, the back surface, do not replicate the path of the recording head so the servo sampling rate is not constant but varies with radial position of the head. The disk drive servo control system implements a method to enable track seeking from one data track to another data track, regardless of whether the initial disk surface and the destination disk surface are front or back surfaces.

12 Claims, 9 Drawing Sheets

U.S. PATENT DOCUMENTS

2006/0279871 A1    12/2006   Albrecht et al.

OTHER PUBLICATIONS

Bandic et al., "Magnetic lithography for servowriting applications using flexible magnetic masks nanofabricated on plastic substrates", Microsystems Technology, DOI 10.1007/s00542-006-0287-8.

Bandic et al., "Patterned magnetic media: impact of nanoscale patterning on hard disk drives", Solid State Technology S7+ Suppl. S, Sep. 2006.

Terris et al., "Topical Review: Nanofabricated and self-assembled magnetic structures as data storage media", J. Phys. D: Appl. Phys. 38 (2005) R199-R222.

* cited by examiner

MAGNETIC RECORDING DISK DRIVE WITH HEAD POSITIONING SERVO CONTROL SYSTEM FOR DISK SURFACES WITH IDENTICAL SERVO PATTERNS

BACKGROUND OF THE INVENTION

1. Field of the Invention

This invention relates generally to a magnetic recording disk drive that has disks with pre-patterned servo patterns formed with a master template, and more particularly to a magnetic recording disk drive with a servo control system for positioning the read/write heads on the disk surfaces by using the servo patterns.

2. Description of the Related Art

Conventional magnetic recording hard disk drives use either horizontal recording wherein the magnetized regions that define the magnetically recorded data bits are oriented in the plane of the recording layer on the hard disks, or perpendicular recording wherein the magnetized regions are oriented perpendicular to the plane of the recording layer. Each recording surface on the disks is a continuous layer of magnetic material that becomes formed into concentric data tracks containing the magnetically recorded data bits when the recording head writes on the magnetic material. Each disk surface also includes a fixed, pre-recorded pattern of servo sectors that cannot be written over by the recording heads and that are used to position the heads to the desired data tracks and maintain the heads on the data tracks.

The conventional method of generating the pattern of servo sectors is by "servo-writing" the pattern on a track-by-track basis, either with a special write head and servo-writer or with the production recording head in the disk drive. Because this is a time-consuming and therefore expensive process, other methods for generating the servo patterns have been proposed.

In contact magnetic duplication or transfer (CMT), sometimes referred to as magnetic printing or magnetic lithography (ML), a "master" template is used that contains regions or islands of soft (low-coercivity) magnetic material in a pattern corresponding to the servo pattern that is to be transferred to the disk. The CMT master template is typically a rigid substrate or a rigid substrate with a plastic film formed on it, as described in U.S. Pat. Nos. 6,347,016 B1 and 6,433,944 B1; and by Ishida, T. et al., "Magnetic Printing Technology-Application to HDD", *IEEE Transactions on Magnetics*, Vol 39, No. 2, March 2003, pp 628-632. U.S. Pat. No. 6,791,774 B1, assigned to the same assignee as this application, describes a CMT template and process for forming servo patterns in perpendicular magnetic recording disks. Magnetic lithography (ML) using a flexible master template is described in U.S. Pat. No. 6,798,590 B2, assigned to the same assignee as this application, and by Bandic et al., "Magnetic lithography for servowriting applications using flexible magnetic masks nanofabricated on plastic substrates", *Microsystems Technology*, DOI 10.1007/s00542-006-0287-8.

The CMT process for forming servo patterns is applicable not only to conventional "continuous" magnetic media wherein the concentric data tracks are formed in the continuous layer of magnetic material by the recording heads, but also to "discrete track" media. In this type of media, as described for example in U.S. Pat. No. 4,912,585, each data track consists of continuous magnetic material, but the individual data tracks are separated by nonmagnetic guard bands. The CMT process may be used to form not only the servo patterns but also the discrete tracks.

Patterned magnetic media has been proposed to replace conventional continuous magnetic media to increase the data storage density in disk drives. In patterned media the magnetic material on the disk surface is patterned into small isolated data islands such that there is a single magnetic domain in each island or "bit". To produce the required magnetic isolation of the patterned data islands, the magnetic moment of the regions between the islands must be destroyed or substantially reduced so as to render these regions essentially nonmagnetic. Alternatively, the patterned media may be fabricated so that that there is no magnetic material in the regions between the islands. Patterned media can be produced by replication from a master template via nanoimprinting. The nanoimprinting process forms not only the isolated data islands in the data tracks, but also the servo patterns. In nanoimprinting a master mold or template replicates a topographic pattern onto a polymeric resist coating on the disk substrate, followed by sputter deposition of magnetic material over the pattern. Nanoimprinting of patterned media is described by Bandic et al., "Patterned magnetic media: impact of nanoscale patterning on hard disk drives", *Solid State Technology* S7+Suppl. S, SEP 2006; and by Terris et al., "TOPICAL REVIEW: Nanofabricated and self-assembled magnetic structures as data storage media", *J. Phys. D: Appl. Phys.* 38 (2005) R199-R222.

In hard disk drives, the servo pattern on the back surface of the disks is not identical to, but is rather the mirror image of, the servo pattern on the front surface of the disks. Thus, to form servo patterns by either CMT or nanoimprinting, it is necessary to fabricate two master templates, one for the front surfaces of the disks and one for the back surfaces of the disks. This doubles the time and cost to fabricate the master templates. In the case of nanoimprinting, the master template can be very expensive and require several days to fabricate because it is typically generated by relatively costly and slow e-beam lithography equipment.

Pending application Ser. No. 11/740,289, filed Apr. 26, 2007 and assigned to the same assignee as this application, describes a disk drive with disks that have identical pre-patterned servo patterns on the front and back disk surfaces. The servo sectors on the two disk surfaces of each disk form identical patterns of angularly spaced arcuate-shaped lines that extend generally radially across the data tracks. The arcuate-shaped lines on one surface, e.g., the front surface, generally replicate the path of the recording head as it is moved across the data tracks by the rotary actuator, so that there is a constant sampling rate of the servo sectors on the front surface regardless of radial position of the head. However, the arcuate-shaped lines on the other surface, i.e., the back surface, do not replicate the path of the recording head so the servo sampling rate is not constant but varies with radial position of the head. Thus when the servo control system is operating from servo sectors on the back surface, the servo control processor calculates a timing adjustment from an estimate of the radial position of the head. This timing adjustment is then used to adjust the time to open a time window to allow detection of the servo sectors on the back surface.

What is needed is a magnetic recording disk drive that has disks with identical servo patterns on the front and back disk surfaces, and a disk drive with a servo control system that can operate with the identical servo patterns but that does not require the calculation of a timing adjustment.

SUMMARY OF THE INVENTION

The invention is a magnetic recording disk drive with disks that have identical pre-patterned servo patterns on the front and back surfaces and a servo control system for positioning the read/write heads using the servo signals from the identical servo patterns. The servo patterns on each disk surface are pre-patterned with a single master template, resulting in the identical pattern on each disk surface. The servo sectors on the two disk surfaces form identical patterns of angularly spaced arcuate-shaped lines that extend generally radially across the data tracks. The arcuate-shaped lines on one surface, the front surface, generally replicate the path of the recording head as it is moved across the data tracks by the rotary actuator, so that there is a constant sampling rate of the servo sectors on the front surface regardless of radial position of the head.

However, the arcuate-shaped lines on the other surface, i.e., the back surface, do not replicate the path of the recording head so the servo sampling rate is not constant but varies with radial position of the head. The disk drive servo control system implements a method to enable track seeking from one data track to another data track, regardless of whether the initial disk surface and the destination disk surface are front or back surfaces. The servo signal from a front surface is used during a first seek phase and the servo signal from the destination surface is used during the last phase of the seek, even if the destination surface is a back surface. For example, if the target sector where data is to be read or written is on a back surface, then during seeking the servo signal from a front surface, which may or may not be the initial disk surface, is used for the first phase of the seek, and the servo signal from the destination surface, which is a back surface, is used during the last phase of the seek. During the first phase of the seek, the constant frequency of the servo sectors from the front surface applies. The servo control system switches over to receive the servo signals from the destination surface during the second phase of the seek, i.e., when the head is within a predetermined number of tracks where variation in servo timing is small enough to be tolerated.

For a fuller understanding of the nature and advantages of the present invention, reference should be made to the following detailed description taken together with the accompanying figures.

DETAILED DESCRIPTION OF THE INVENTION

Figure 1:
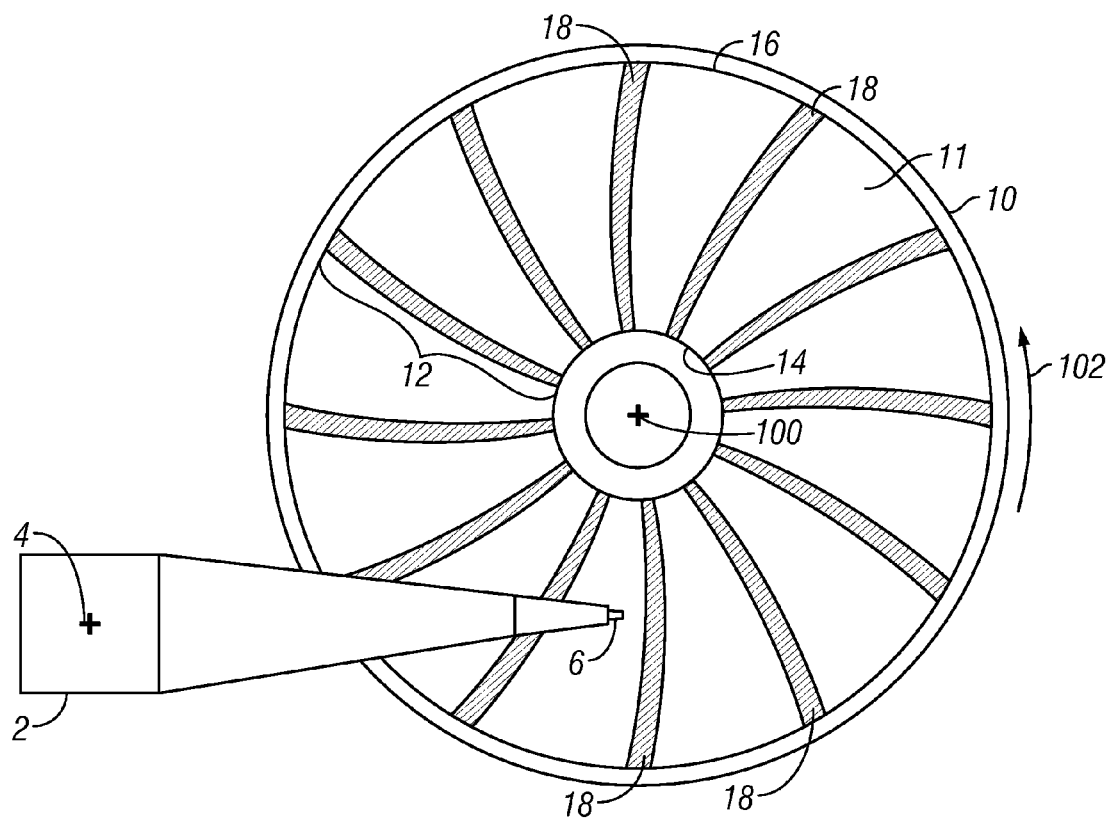
FIG. 1 is a schematic of a prior art disk drive with a rotary actuator and a rigid magnetic recording disk having pre-patterned servo sectors formed on a first or "front" surface.

FIG. 1 illustrates a disk drive with a rotary actuator 2 and a rigid magnetic recording disk 10 having pre-patterned servo sectors 18 formed on a first or "front" surface 11. The disk 10 rotates in the direction 102 about a central axis 100. The front surface 111 has an annular data band 12 which is defined by an inside diameter (ID) 14 and an outside diameter (OD) 16. The portions of the data band between the servo sectors 18 are used for the storage of user data and contain circular data tracks, with each data track being typically divided into physical data sectors. The rotary actuator 2 rotates about pivot 4 and supports a read/write head 6 at its end. As the actuator 2 rotates, the head 6 follows a generally arcuate path between ID 14 and OD 16.

The servo sectors 18 are not formed by conventional servowriting but by a patterning process using a master template. In contact magnetic transfer (CMT), also called magnetic lithography (ML), a magnetic mask serves as the master template. In nanoimprinting a master template replicates a topographic pattern onto a polymeric resist coating on the disk substrate, followed by sputter deposition of magnetic material over the pattern. The servo sectors 18 form a pattern of angularly spaced arcuate lines that extend generally radially from ID 14 to OD 16. The arcuate shape of the servo sectors matches the arcuate path of head 6. During operation of the disk drive, the head 6 reads or writes data on a selected one of a number of concentric circular data tracks located between the ID 14 and OD 16 of the annular data band 12. To accurately read or write data from a selected track, the head 6 is required to be maintained over the centerline of the track. Accordingly, each time one of the servo sectors 18 passes beneath the head 6, the head 6 detects discrete magnetized servo blocks in the position error signal (PES) field in the servo sector. A PES is generated and used by the disk drive's head positioning control system to move the head 6 towards the track centerline. Thus, during a complete rotation of the disk 10, the head 6 is continually maintained over the track centerline by servo information from the servo blocks in successive angularly spaced servo sectors 18.

Figure 2:
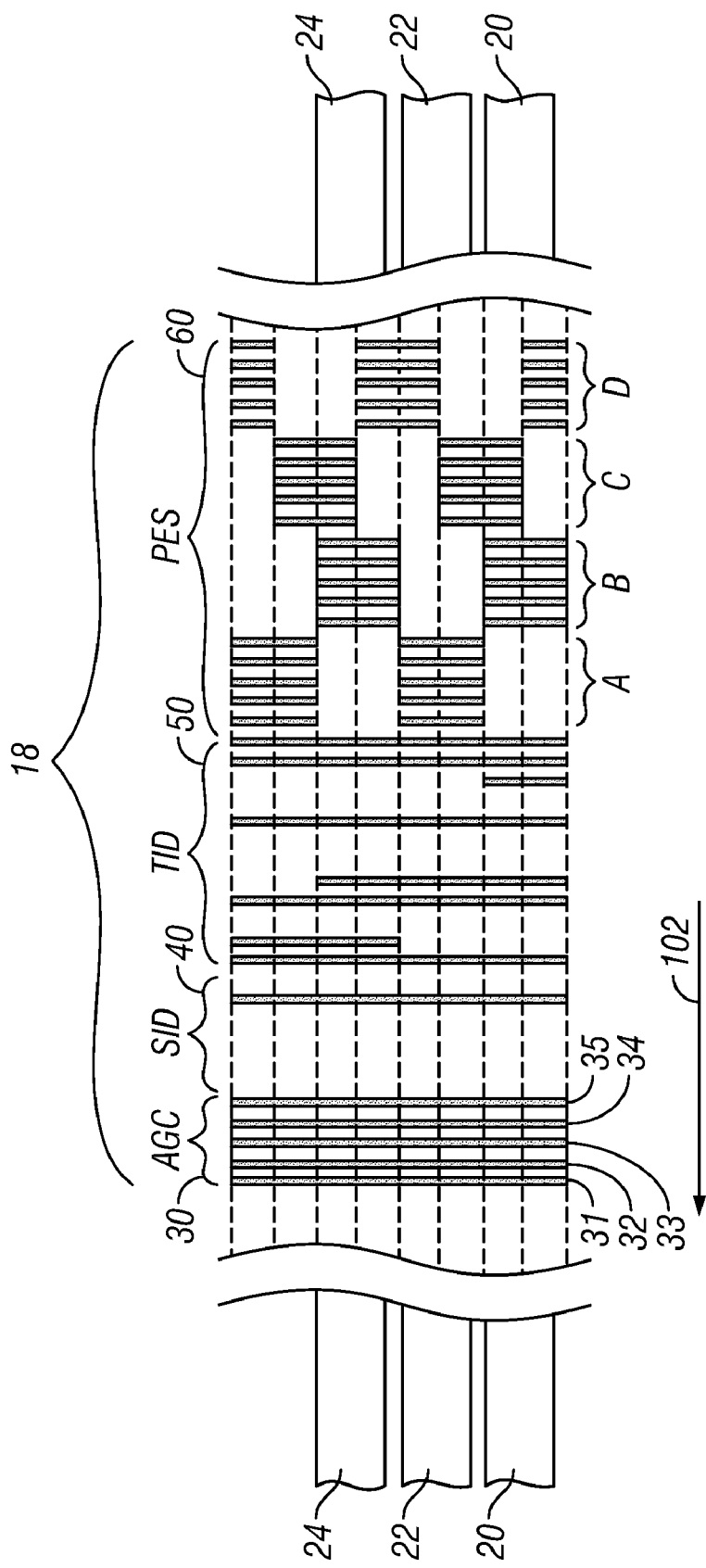
FIG. 2 is an expanded view of a portion of a typical servo sector and portions of three data tracks of the prior art disk shown in FIG. 1.

An expanded top view of a typical servo sector 18 and portions of three data tracks is shown in FIG. 2. The three data tracks 20, 22, 24 are shown in outline. If the disk 10 is the type with a continuous layer of magnetic recording material in the data portions of surface 11, then the tracks 20, 22, 24 are continuous tracks whose radial width is defined generally by the head 6 when it records on the continuous recording layer. If the disk 10 is the type with discrete tracks, then the tracks 20, 22, 24 would contain continuous recording material along the tracks but the tracks would be separated from each other by nonmagnetic guard bands. If the disk 10 is the type with patterned media, then the tracks 20, 22, 24 would each contain discrete islands of magnetizable material.

All of the shaded portions of FIG. 2 represent discrete servo blocks magnetized in the same direction. They may all be magnetized in the same direction horizontally, i.e., in the plane parallel to the plane of the paper in FIG. 2, if the disk drive is designed for longitudinal or horizontal magnetic recording, or perpendicularly, i.e., into or out of the plane of the paper, if the disk drive is for perpendicular magnetic recording. It is also possible that every other shaded region in FIG. 2 might have opposite polarity, with the unshaded regions being nonmagnetic, which improves the signal quality of the servo pattern, as described in application Ser. No.

11/149,028, published as US20060279871 A1 and assigned to the same assignee as this application. If the servo sectors 18 are formed by CMT then the non-shaded portions of FIG. 2 represent regions that are magnetized in the opposite direction from the magnetization of the servo blocks because they retain this opposite magnetization from a DC magnetization process prior to the CMT process. If the servo sectors 18 are formed by nanoimprinting then the non-shaded portions of FIG. 2 represent nonmagnetic regions, i.e. either regions of nonmagnetic material or regions of magnetic material generally incapable of being magnetized by the write head.

The servo blocks that make up servo sector 18 are arranged in fields 30, 40, 50 and 60, as shown in FIG. 2. Servo field 30 is an automatic gain control (AGC) field of blocks 31-35 that are used to measure the amplitude of the signal and adjust the provide gain for the subsequently read servo blocks. Servo field 40 is sector identification (SID) field, also called a servo timing mark or STM field, to provide a timing mark to establish start/stop timing windows for subsequent servo blocks. Servo field 50 is a track identification (TID), also called the cylinder or CYL field because the tracks from all of the disk surfaces in a disk drive with a multiple stacked disks form a "cylinder" of tracks. The TID field 50 contains the track number, typically Gray-coded, and determines the integer part of the radial position. Servo field 60 is the position error signal (PES) field, which in this example contain A, B, C, D subfields of servo blocks as part of the well-known "quad-burst" PES pattern, and are used to determine the fractional part of the radial position. In some cases, a separate servo sector counter field (not shown) may be located between the TID and PES fields for encoding the servo sector number.

Figure 3:
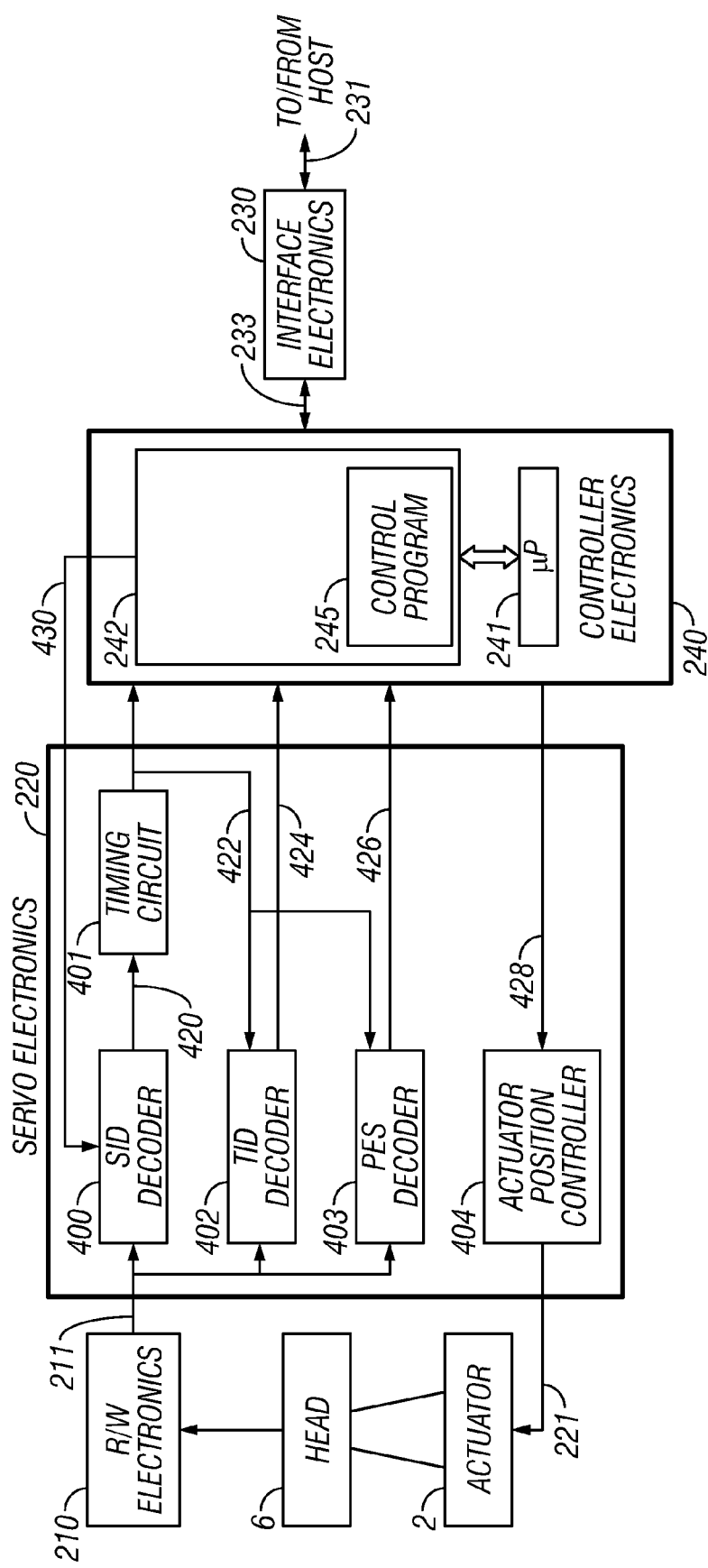
FIG. 3 is a block diagram of a disk drive servo control system for use with this invention.

FIG. 3 is a block diagram of the disk drive servo control system and illustrates the read/write electronics 210, servo electronics 220, interface electronics 230, and controller electronics 240. Read/write electronics 210 receives signals from head 6, passes servo information from the servo sectors to servo electronics 220, and passes data signals to controller electronics 240. Servo electronics 220 uses the servo information to produce a signal at 221 which drives actuator 2 to position the head 6. Interface electronics 230 communicates with a host system (not shown) over interface 231, passing data and command information, including requests from the host system for reading from or writing to the data sectors of disk 10. Interface electronics 230 communicates with controller electronics 240 over interface 233.

Controller electronics 240 includes a microprocessor 241 and associated memory 242 with stored computer programs for executing various algorithms, including a control program 245 that executes the control algorithm. The control algorithm uses a set of parameters stored in memory 242 and based on the static and dynamic characteristics of the actuator 2. The control algorithm is essentially a matrix multiplication algorithm, and the parameters are coefficients used in the multiplication.

Controller electronics 240 receives a list of requested data sectors from interface electronics 230 and converts them into cylinder (i.e., track), head, and data sector numbers which uniquely identify the physical location of the desired data sectors on disk 10. The head and cylinder numbers are passed to servo electronics 220, which positions head 6 over the appropriate data sector on the appropriate cylinder. If the cylinder number provided to servo electronics 220 is not the same as the cylinder number over which head 6 is presently positioned, servo electronics 220 first executes a "seek" operation to move the head 6 from its present cylinder to the desired cylinder.

The servo electronics 220 first begins executing sector computations to locate and identify the desired data sector. As servo sectors pass under head 6, each servo sector is detected. In brief, the SID is used to locate servo sectors, and a count of SIDs from a servo sector containing an index mark uniquely identifies each servo sector. SID decoder 400 receives a control input 430 from the controller electronics 240 that opens a time window for detection of the next SID. SID decoder 400 then receives a clocked data stream 211 as input from the read/write electronics 210. Once a SID has been detected, a SID found signal 420 is generated. The SID found signal 420 is used to adjust timing circuit 401, which controls the operating sequence for the remainder of the servo sector. After detection of a SID, the track identification (TID) decoder 402 receives timing information 422 from timing circuit 401, reads the signals generated by TID field 50 (FIG. 2), and then passes the decoded TID information 424 to controller electronics 240. During a seek operation the controller electronics 240 uses the TID information to estimate the position and velocity of the head from a stored program of instructions represented as control program 245.

Once servo electronics 220 has positioned head 6 over the appropriate cylinder, the servo fields are read by the head 6 and read/write electronics 210 inputs signals 211 to the servo electronics 220. Subsequently, PES decoder 403 captures the signals from PES field 60 (FIG. 2), then passes the PES 426 to controller electronics 240. Controller electronics 240 uses the PES as input to a control algorithm to calculate the signal 428 to actuator position controller 404 to maintain the head 6 on the centerline of the desired track.

Referring again to FIG. 1, it can be seen that the servo sectors 18 are shaped as an arc whose center of whose center of rotation is the pivot 4 of actuator 2. This arcuate shape for the servo sectors assures that the time interval between successive sector sectors passing the head remains fixed, regardless of which track the head is on. This simplifies the design and operation of the head-positioning servo system because a constant servo sampling rate is achieved regardless of head motion. This arcuate shape is also the shape of the servo sectors when the servo pattern is created using conventional track-by-track servowriting methods (external servowriting and self-servowriting).

Figure 4A:
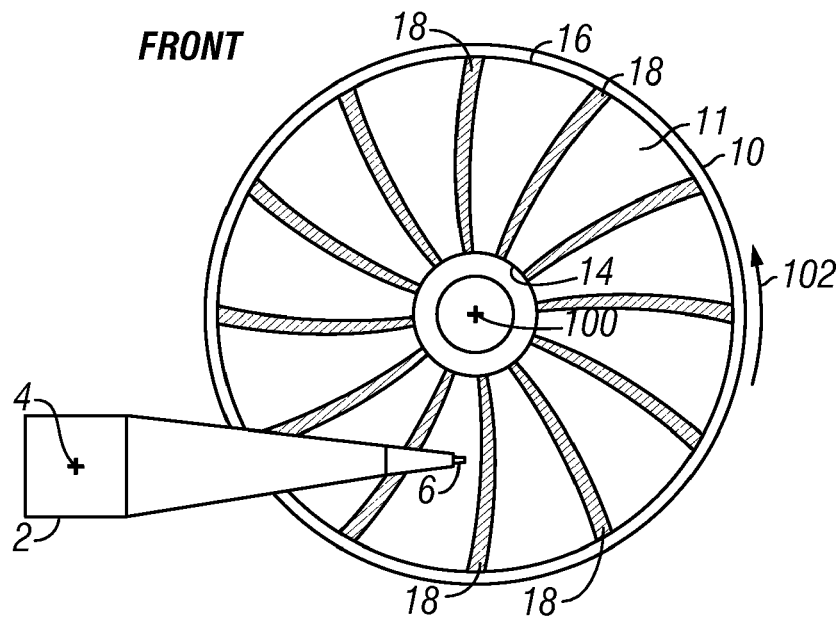
FIGS. 4A and 4B show the comparison of the servo patterns on the front (FIG. 4A) and back (FIG. 4B) surfaces of a prior art disk.
Figure 4B:
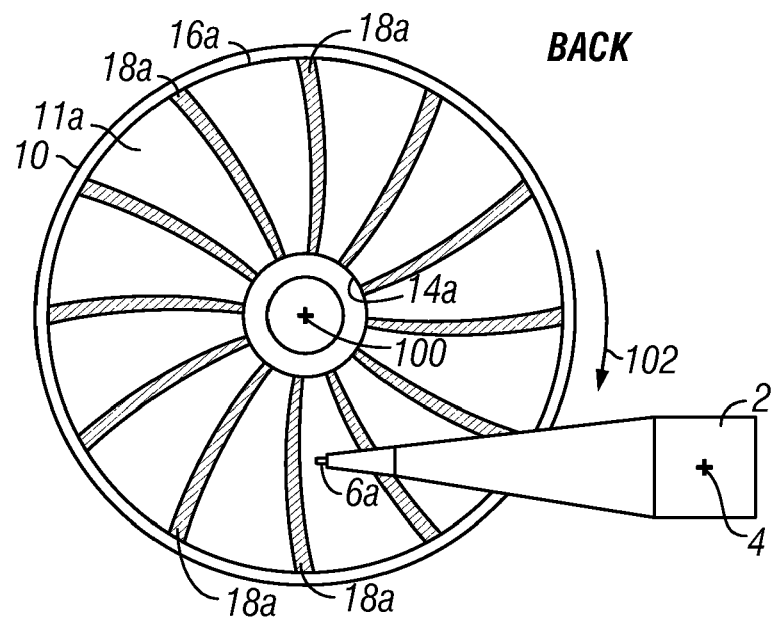

However, this requirement for the shape of the servo sectors means that the second or "back" surface of each disk must be the mirror image of the first or front surface. This also assures that the order of the servo fields (FIG. 2) detected by the head is the same for each disk surface so that no modification of the servo control system is required. FIGS. 4A and 4B show the comparison of the front surface 11 (FIG. 4A) and back surface 11a (FIG. 4B) of a prior art disk 10 as the disk rotates in the direction 102. A comparison of the direction of curvature of the arcuate servo sectors 18 (FIG. 4A) with the direction of curvature of the arcuate servo sectors 18a (FIG. 4B) shows that the two servo patterns are not identical, but mirror images of one another. Thus the master template used to pattern servo sectors 18a on back surface 11a must be the mirror image of the master template used to pattern servo sectors 18 on front surface 11. However, this requires that two different master templates must be fabricated and used to form the servo patterns for a single disk.

Figure 5A:
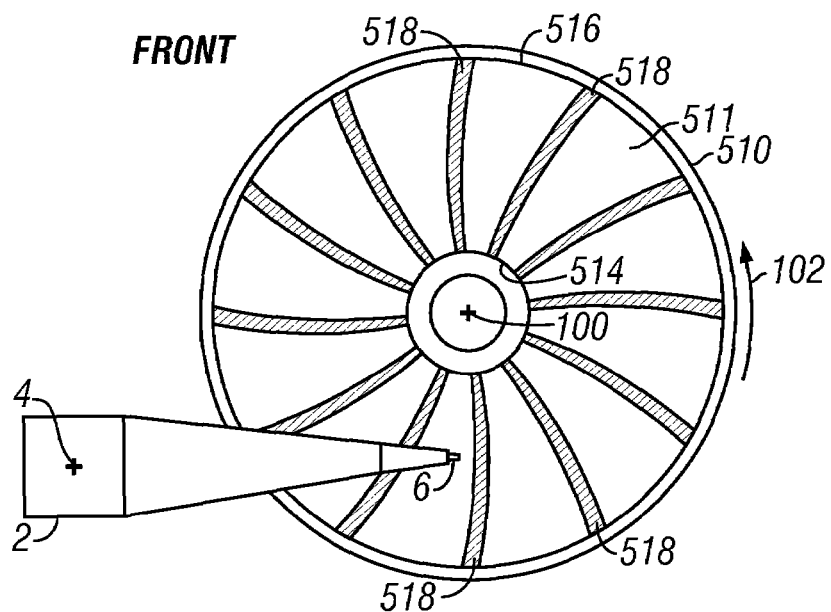
FIGS. 5A and 5B show the identical servo patterns of the front surface (FIG. 5A) and back surface (FIG. 5B) of one embodiment of a disk according to this invention.
Figure 5B:
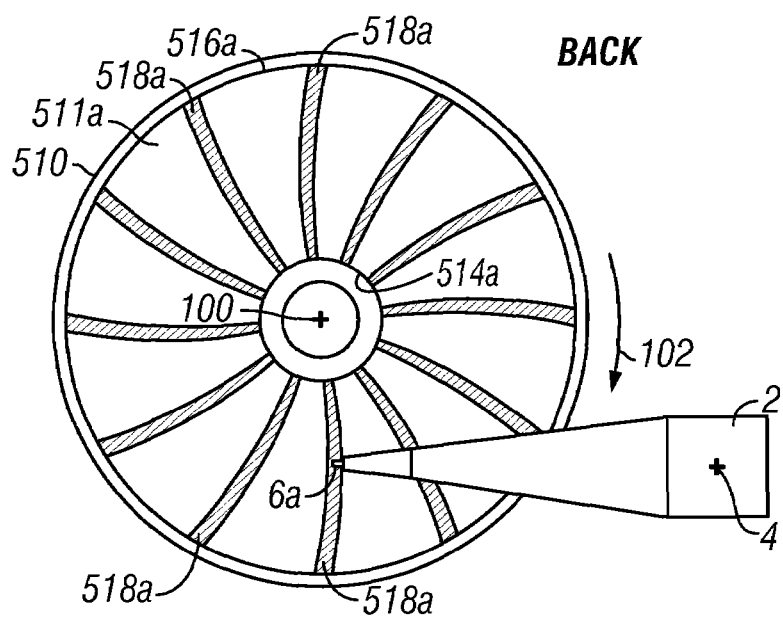

In the previously-cited pending application Ser. No. 11/740,289, a single master template is used for both disk surfaces, resulting in the front and back surfaces having identical servo patterns. FIGS. 5A and 5B show the identical servo patterns of the front surface 511 (FIG. 5A) and back surface 511a (FIG. 4B) of a disk 510 as described in pending application Ser. No. 11/740,289. A comparison of the direction of curvature of the arcuate servo sectors 518 (FIG. 5A) with the direction of curvature of the arcuate servo sectors 518a (FIG. 5B) shows that the two servo patterns are identical. However, it is apparent that the servo sectors 518a on back surface 511a do not have a shape that follows the arc of actuator 2, so that a constant servo sample rate will not be achieved on surface 511a.

While the above description and figures have shown only a single disk, disk drives typically have multiple disks stacked on the rotatable spindle. Thus the disk drive of the present invention may have one or more disks, each with front and back disk surfaces, 511, 511a, respectively.

Also, because the servo patterns on surfaces 511 and 511a are identical, the order of the servo fields detected by the head 6a on back surface 511a will be the reverse of the order of the servo fields detected by the head 6 on front surface 511. Thus, the arrangement of the fields within the servo sectors are also modified, as described in the pending application Ser. No. 11/740,289. In one embodiment, there is no change to the servo fields, but the servo sectors on back surface 511a are read in the opposite order, i.e., PES, CYL, SID, AGC, and stored in memory. After the AGC is read and interpreted for servo signal amplitude, the SID is analyzed and timing is established. Even though the SID mark is time-reversed compared to expected, still the same correlation procedure used for front surface 511 may be used, with the exception that there is an accommodation for the inverted bit sequence. After timing is established, the CYL values are decoded (again taking into account the inverted sequence of bits), and the PES is decoded. In this embodiment there is a time delay on back surface 511a corresponding generally to the length of one servo sector because the servo sector is read and stored in memory before any calculations are performed by controller electronics 240.

Figure 6:
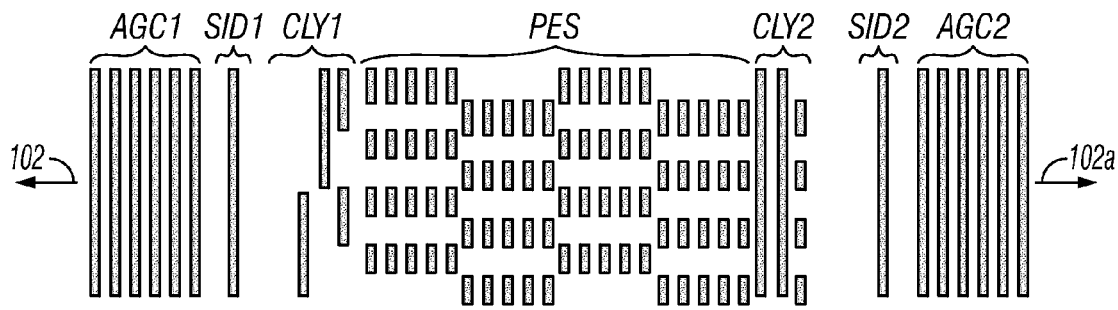
FIG. 6 is a view of a portion of a servo sector according to this invention with substantially symmetric servo fields.

In another embodiment servo sectors with substantially symmetric servo fields are used, as shown in FIG. 6. In the embodiment of FIG. 6, the order in which the servo fields is read is the same for the front and back surfaces. For example, for front surface 511 as shown in FIG. 5A, the servo fields would move in the direction indicated by arrow 102, while for back surface 511a as shown in FIG. 5B, the servo fields would move in the direction indicated by arrow 102a. The servo fields are substantially symmetric about the center of the servo sector. The PES field is located in the center of the servo sector, with the CYL code distributed as CYL1 and CYL2 on opposite ends of the PES field. The complete CYL field normally contains m bits that contain actual track information and n error correction code (ECC) bits, where typically m and n have similar values. For the symmetric format of FIG. 6, the CYL field is split into two subfields (CL1 and CYL2). CYL1 and CYL2 may each provide partial information about the cylinder number, whereas both are needed to obtain accurate track number involving ECC as well. For example, CYL1 and CYL2 can each have m+n/2 bits. This allows enough information for long seeks. Identical AGC fields AGC1 and AGC2) are located at each end of the servo sector, and identical SID fields (SID1 and SID2) are located between respective AGC and CYL fields. In the servo sector format shown in FIG. 6, the additional disk surface "overhead" is for the second SID field as well as the extra m bits of the second CYL field. In a typical servo system, for example 140 servo sectors angularly spaced around each disk surface, this would result in approximately 16 bits of overhead for having two CYL fields (assuming no ECC) and about 12-16 bits for the second SID field. A typical servo sector may have approximately 40 bits of AGC, 12 bits of SID, 32 bits of track code, 12 bits of sector code and 48 bits of PES code, for total of approximately 144 bits. The additional 28-32 bits is thus approximately a 20% increase in servo overhead over the conventional servo pattern (FIG. 2).

Figure 7:
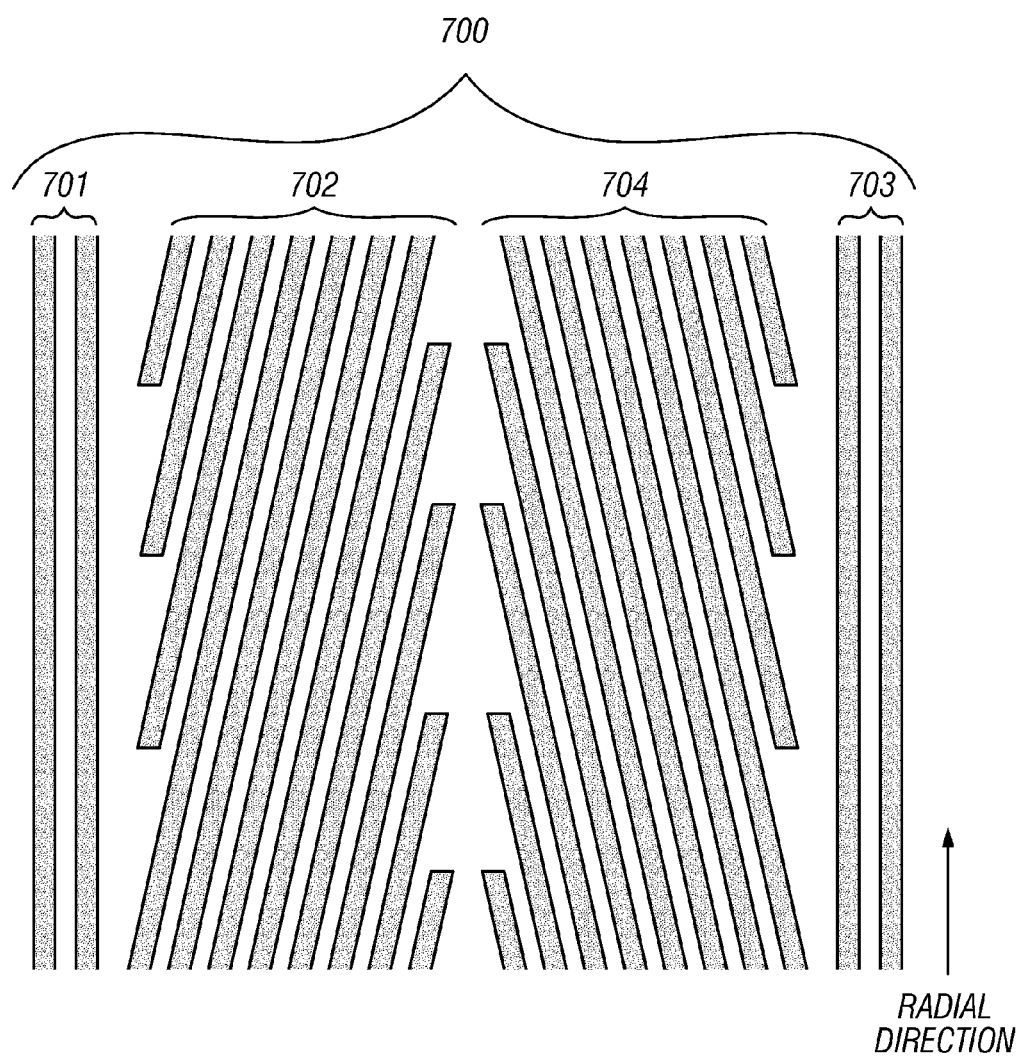
FIG. 7 is a view of a portion of a servo sector according to this invention with substantially symmetric servo fields for use with a phase-based servo system (also called a timing-based servo system).

Another embodiment of servo sectors with substantially symmetric servo fields uses a phase-based servo system (also called a timing-based servo system), whose pattern is shown in FIG. 7. The PES field 700 includes two symmetric sets 702, 704 of generally slanted position marks extending generally radially across multiple tracks. Identical start-of-field (SOF) marks 701, 703 are located on respective ends of PES field 700 and extend radially across the tracks. The time from detection of a SOF mark to detection of a slanted position mark indicates the radial position of the head. This type of PES field is different from the conventional quad-burst PES field 60 in FIG. 2, and thus a different type of PES decoding system is used. The phase-based servo system and decoding method is well-known, as described for example in U.S. Pat. Nos. 5,689,384; 5,923,272 and 5,930,065. In the embodiment of FIG. 7, the CYL fields can be encoded in additional patterns located before or after the sets 702, 704. Alternatively, the CYL fields can be encoded within the sets 702, 704 of slanted position marks by shifting pairs of position marks early or late relative to other position marks in the pattern, in a manner which does not affect the overall phase relationship between the position marks. An example of such encoding with timing-based patterns is described in the previously-cited U.S. Pat. Nos. 5,923,272 and 5,930,065. Since this method of encoding a CYL field embeds only a single bit or a few bits within each servo sector, a complete reading of a complete CYL address requires several successive servo sectors.

The present invention relates to a disk drive servo control system for positioning the heads on the disks that have disk surfaces with identical servo patterns, like the arcuate-shaped servo sectors as shown in FIGS. 5A-5B. In the method of this invention, the servo signal from a "front" surface 511 is used for a first phase of a seek, and the servo signal from the surface with the target data sector is used during the last phase of the seek. For example, if the target sector is on a "back" surface 511a then, depending on the length of the seek, the controller electronics 240 uses the servo signal from a surface with the "correct" servo pattern, such as surface 511, for the first portion of the seek, and the servo signal from the surface 511a that has the target data sector during the last portion of the seek. During the first phase of the seek, the constant frequency of the servo sectors 518 from front surface 511 applies. The controller electronics 240 switches over to receive the servo signals from the target surface 511a during the second phase of the seek. During the seek's second phase, the timing variation from the servo sectors 518a on back surface 511a is small enough to ignore.

Figure 8:
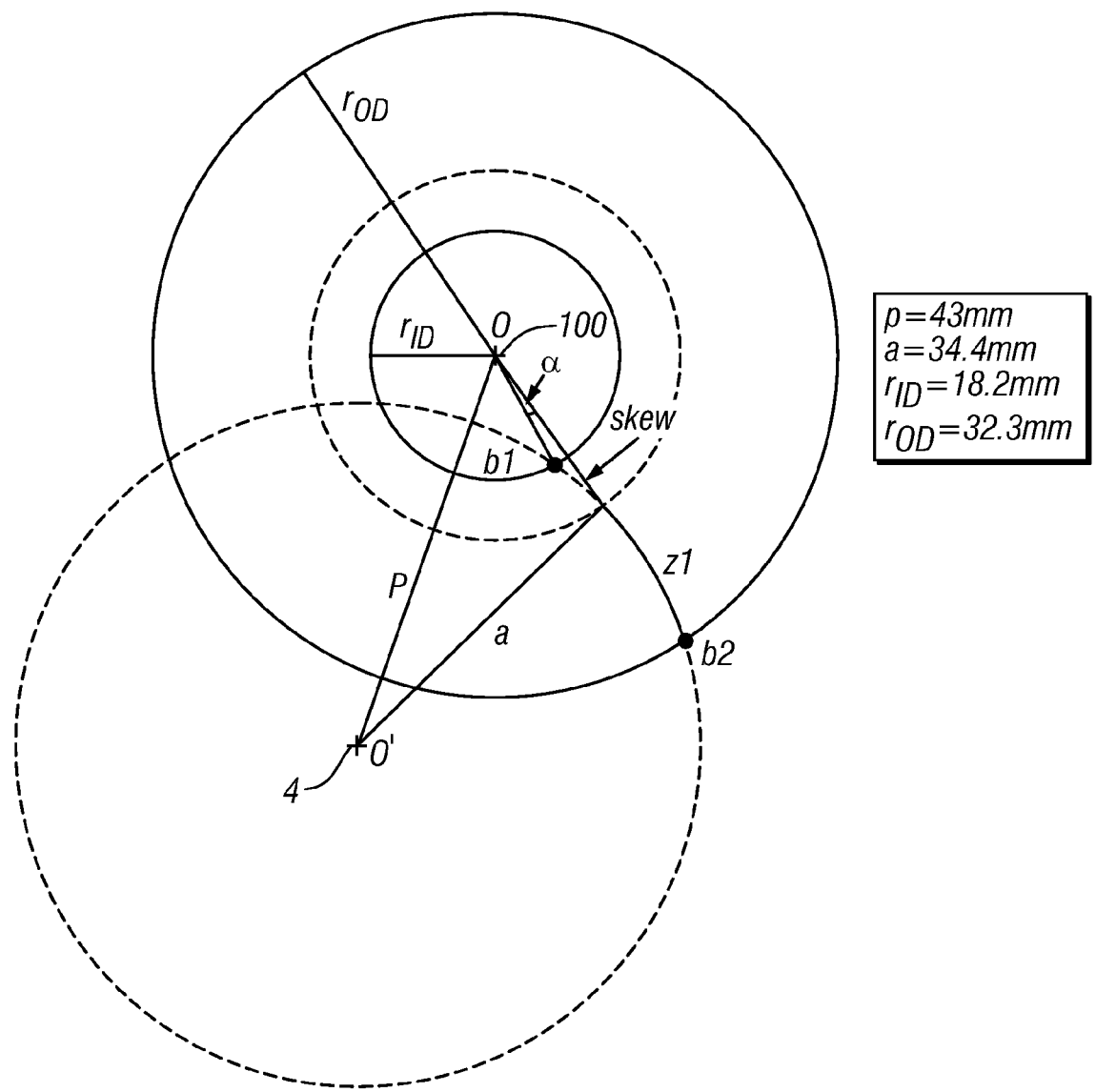
FIG. 8 is an illustration of typical disk drive geometry.

It is possible to estimate at what point the switch between the starting surface and the target surface can be made. The arcuate shape of the servo sectors on a back surface 511a cause a timing error in the servo sector detection window from the "correct" arcuate shape on a front surface 511. This will be explained with the use of FIG. 8, which shows a typical disk drive geometry. The actuator is located at distance p between pivot 4 and disk central axis 100, and has an actuator length a, which is the distance from pivot 4 to the actuator tip RW where the head is located. The head on the tip of the actuator makes an arc or path Z1 across the disk from a point b1 at disk inner radius $r_{ID}$ to point b2 at disk outer radius $r_{OD}$. In this case conventional servo sectors 518 like those on front surface 511 will have a curvature with radius a. It is straightforward to conclude from FIG. 8 that the "skew" angle as a function of radius is given by:

$$\alpha(r) = \arccos\frac{p^2 + r^2 - a^2}{2pr} - \arccos\frac{p^2 + r_{ID}^2 - a^2}{2pr_{ID}}$$

Because the head is fixed at the tip of the actuator, the magnetic transitions written by head are not collinear with the radius (or not orthogonal to the track direction). This is called head "skew". From the triangle (4-100-RW) the head skew is given by:

$$skew = 90 - \arccos\frac{a^2 + r^2 - p^2}{2ar}$$

Figure 9:
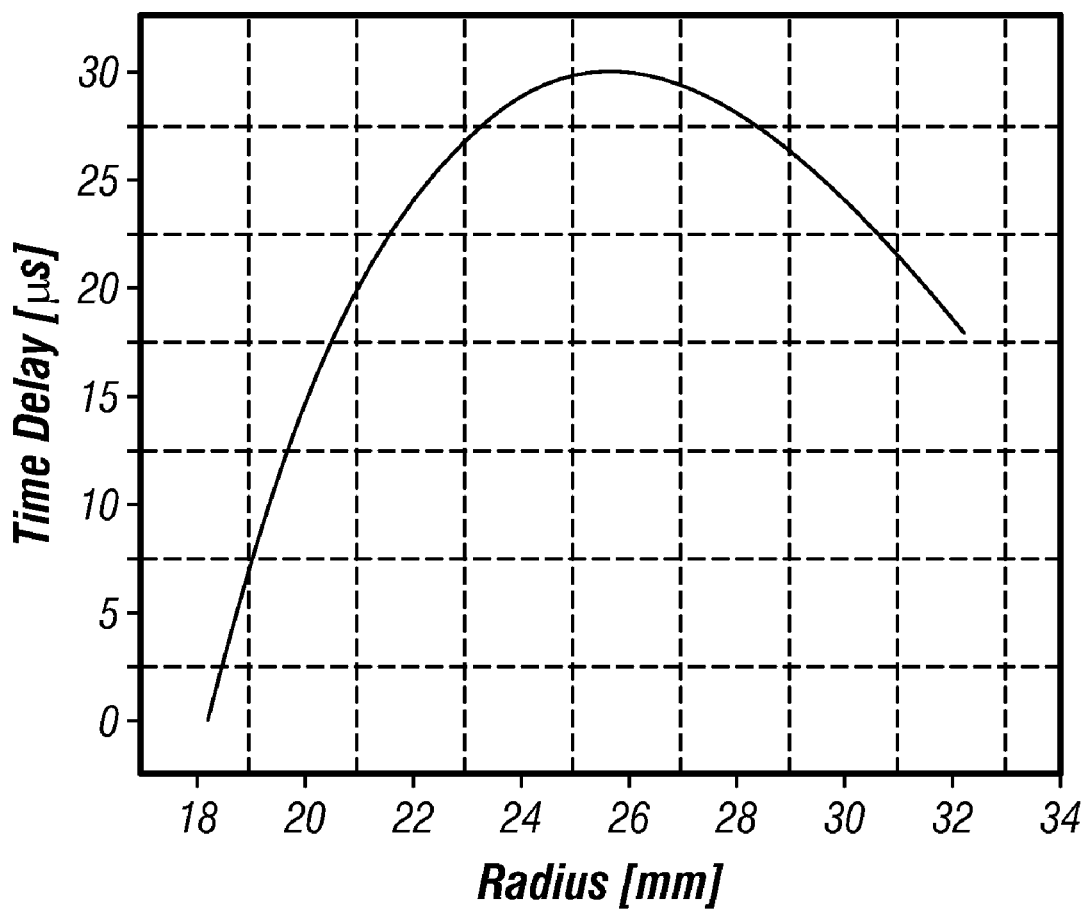
FIG. 9 is a graph of timing adjustment as a function of radius, relative to zero timing adjustment at the inner radius ($r_{ID}$), for a disk surface with straight-line servo sectors.

The time delay of the arcuate sector, when compared to a linear sector (the one that would result from drawing a straight line from b1 to b2) is given by:

$$\tau(r) = \frac{60}{rpm} \times \frac{\alpha(r)}{360°}$$

where the angle alpha is expressed in degrees. This timing adjustment is plotted in FIG. 9 as a function of radius, and relative to the timing adjustment at $r_{ID}$, which is assumed to be 0. FIG. 9 is generated based on the dimensions listed in FIG. 8 at a disk rpm of 15,000.

From FIG. 9 the maximum rate of time delay change is about 10 μs/mm. A typical servo system can tolerate SID timing variations of up to about 100 ns=0.1 μs (exact tolerable timing variation depends on the implemented size of the SID timing window). Therefore, during the final phase on the target surface it may be possible to tolerate head "wandering" of up to 0.1 μs/(10 μs/mm) or about 0.01 mm (10 μm). This distance may contain about 50-100 tracks in a typical disk drive. This 10 μm limit also indicates the level of preferred concentricity between front and back surface of the disks, i.e., the difference in disk runout between the front and back surface of a disk which will necessarily be present due to the disk fabrication process. Thus if the seek length is less than this distance (a predetermined number of data tracks) there is no need to switch from one surface during a first phase of the seek to a second surface during the second phase of the seek.

Figure 10:
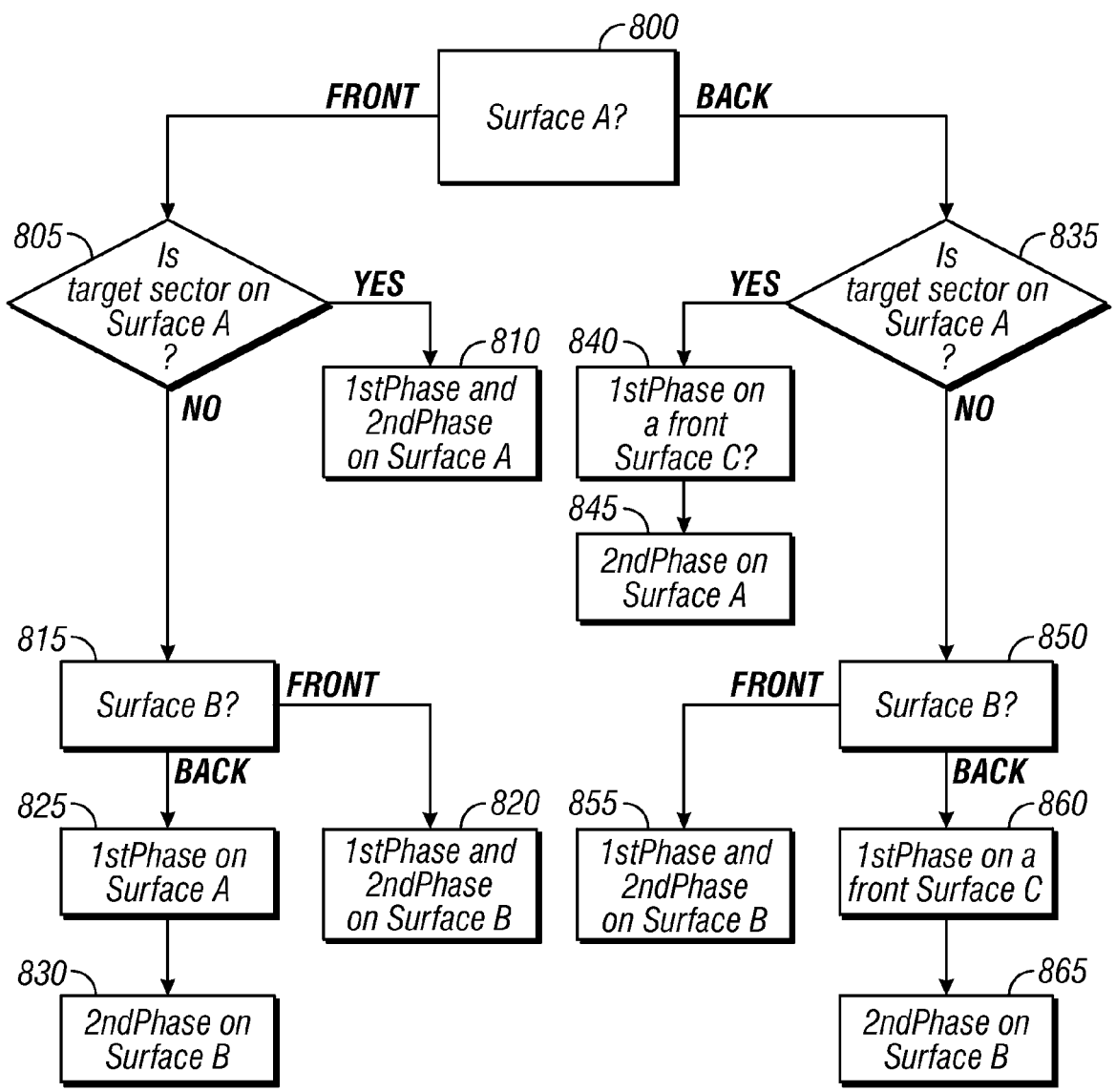
FIG. 10 is a flow chart illustrating the method of this invention.

FIG. 10 is a flow chart illustrating the method of the present invention in more detail. The flow chart is for the purpose of illustrating an algorithm that can be implemented as computer program instructions stored in memory 242 as part of the control program 245 (FIG. 3).

Prior to the initiation of a track seek from one cylinder to another cylinder, the servo control system is in a track "following" mode, wherein the head associated with a disk surface A is maintained on an initial data track contained within the initial or first cylinder. First, a determination is made as to whether the seek length is greater than a predetermined value, e.g., 50 tracks in the example given above. If it is less then this value, then a switch is made to the target or destination surface and the entire seek is performed on the target surface. If the seek length is less than this predetermined value and the initial surface (surface A) is also the destination surface then the entire seek is performed on the initial surface.

However, if the seek length is greater than this predetermined value, then a determination is made whether the initial surface on which track following is taking place (surface A) is a front or back surface (block 800).

If surface A is a front surface then a determination is made as to whether the target data sector (and thus the target data track) is also on surface A (block 805). If it is then both phases of the complete seek are performed using the servo signals from surface A (block 810). If the target data track is not on surface A, then it is on the destination surface B. Then, at block 815, a determination is made whether destination surface B is a front or back surface. If surface B is a front surface then the servo control system switches from track following on surface A using the servo signals from surface A, to receive servo signals from surface B, with both phases of the complete seek being performed using the servo signals from surface B (block 820). However, if destination surface B is a back surface then the servo control system continues to use the servo signals from surface A during the first phase (block 825), but switches over to receive servo signals from surface B during the second phase (block 830) when the head is within the predetermined number of tracks from the target track.

Referring back to block 800, if surface A is a back surface then a determination is made as to whether the target data track is also on surface A (block 835). If it is then the servo control system switches from track following on surface A using the servo signals from surface A, to receive servo signals from surface C, where surface C is any front disk surface, during the first phase (block 840). The servo control system then switches back to receive servo signals from surface A during the second phase (block 845). If the target data track is not on surface A, then it is on the destination surface B. Then, at block 850, a determination is made whether destination surface B is a front or back surface. If surface B is a front surface then the servo control system switches from track following on surface A using the servo signals from surface A, to receive servo signals from surface B, with both phases of the complete seek being performed using the servo signals from surface B (block 855). However, if destination surface B is a back surface then the servo control system switches over to receive servo signals from surface C, where surface C is any front disk surface, during the first phase (block 860). The servo control system then switches back to receive servo signals from surface B during the second phase (block 865).

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for operating a magnetic recording disk drive, the disk drive having:

at least one rotatable magnetic recording disk having a front generally planar surface, a back generally planar surface opposite the front disk surface, and a central axis of rotation perpendicular to said surfaces, each disk comprising a plurality of generally concentric circular data tracks of magnetic material on each of said surfaces, the data tracks being centered about said axis; a plurality of servo sectors on the front surface and forming a pattern of generally arcuate lines extending in a generally radial direction across said data tracks between radially inner and outer circles centered at said axis, each servo sector comprising a plurality of discrete blocks of magnetic material, the blocks being arranged in angularly spaced fields along the data tracks; and a plurality of servo sectors on the back surface forming a pattern of generally arcuate lines identical to the pattern of generally arcuate lines on said front surface; the tracks on the disks being aligned into radially-spaced cylinders;

at least one first head, each first head associated with a front surface of a disk for reading and writing to data tracks and for detecting servo sectors on the front surface of a disk;

at least one second head, each second head associated with a back surface of a disk for reading and writing to data tracks and for detecting servo sectors on the back surface of a disk;

an actuator connected to the heads for positioning the heads to different data tracks and maintaining the heads on the data tracks, the actuator causing the first head to follow a generally arcuate path across a front surface that generally replicates the arcuate lines of servo sectors on said front surface and the second head to follow a generally arcuate path across a back surface that also generally replicates the arcuate lines of servo sectors on said front surface; the generally arcuate path of the second head across said back surface not replicating the arcuate lines of servo sectors on said back surface; and a servo control system coupled to the heads and the actuator, the servo control system including a processor for generating an actuator control signal in response to detection of the servo fields by the heads;

the method comprising the processor-implemented steps of:
in response to a request to read or write to a data track on a back surface of a disk, causing the actuator to seek from a first cylinder to a second cylinder containing the requested data track;

during a first phase of said seek, receiving signals from the servo sectors on a front surface of a disk; and during a second phase of said seek, receiving signals from the servo sectors on a back surface of a disk.

2. The method of claim 1 further comprising, prior to receiving said request, receiving signals from the servo sectors on a back surface of a disk to maintain the second head associated with said back surface on the data track contained within said first cylinder.

3. The method of claim 1 wherein the second phase commences when the actuator has positioned the second head to within a predetermined number of tracks of the requested data track on said back surface.

4. The method of claim 1 further comprising, in response to a request to read or write to a data track on a back surface of a disk, determining if the seek length is greater than a predetermined number of data tracks, and wherein receiving signals from the servo sectors on a front surface of a disk comprises receiving signals from the servo sectors on a front surface of a disk only if the seek length is greater than said predetermined number.

5. The method of claim 1 wherein the step of receiving signals from the servo sectors on a front surface of a disk comprises receiving signals from the servo fields in a first order, and wherein the step of receiving signals from the servo sectors on a back surface of a disk comprises receiving signals from the servo fields in a reverse order to said first order.

6. The method of claim 5 wherein the discrete blocks in each servo sector are arranged in angularly spaced fields including an automatic gain control (AGC) field, a sector identification (SID) field, a track identification field (TID), and a servo position error signal (PES) field and wherein the step of receiving signals from the servo fields on a front surface of a disk in a first order comprises receiving signals from the servo fields in the order of AGC, SID, TID and PES.

7. A magnetic recording disk drive comprising:
a plurality of magnetic recording disks, each having a front generally planar surface and a back generally planar surface opposite the front disk surface, the disks being rotatable about a common central axis perpendicular to said disk surfaces, each disk comprising a plurality of generally concentric circular data tracks of magnetic material on each of said surfaces, the data tracks being centered about said axis; a plurality of servo sectors on the front surface and forming a pattern of generally arcuate lines angularly spaced about said axis and extending in a generally radial direction across said data tracks between radially inner and outer circles centered at said axis and, each servo sector comprising a plurality of discrete blocks of magnetic material, the blocks being arranged in angularly spaced fields along the data tracks; and a plurality of servo sectors on the back surface forming a pattern of generally arcuate lines identical to the pattern of generally arcuate lines on said front surface;

a plurality of heads, each head associated with a disk surface for reading and writing to data tracks and for detecting servo sectors on its associated disk surface;

an actuator connected to the heads for moving the heads radially to different data tracks and maintaining the heads on the data tracks, the actuator causing the heads to follow a generally arcuate path across said disk surfaces that is substantially identical to the arcuate line of servo sectors on the front surfaces of the disks and substantially dissimilar to the arcuate line of servo sectors on the back surfaces of the disk; the arcuate lines of servo sectors on front surfaces pass the heads associated with the front surfaces during rotation of the disks at a constant rate as the heads associated with the front surfaces are moved radially by the actuator but the arcuate lines of servo sectors on back surfaces do not pass the heads associated with the back surfaces at a constant rate as the heads associated with the back surfaces are moved radially by the actuator;

a processor for receiving servo signals from the heads in response to detection of the servo fields by the heads and for generating an actuator control signal to position the heads to different data tracks and to maintain the heads on the data tracks;

memory coupled to the processor; and a program of instructions in the memory and readable by the processor for undertaking acts comprising:
receiving servo signals from the head associated with a disk surface A to maintain said head on an initial data track on disk surface A;

receiving a request to read or write to a target data track on a disk surface B;

identifying each of surfaces A and B as either a front surface or a back surface; and if surface A is a front surface and surface B is a back surface, then causing the actuator to position the head associated with surface B to the target data track on surface B by receiving signals from the servo sectors on surface A during a first positioning phase and receiving signals from the servo sectors on surface B during a second positioning phase.

8. The disk drive of claim 7 wherein the program of instructions further comprises instructions for undertaking acts of:
if surface A is a back surface and surface B is a back surface, then causing the actuator to position the head associated with surface B to the target data track on surface B by receiving signals from the servo sectors on a front disk surface C during a first positioning phase and receiving signals from the servo sectors on surface B during a second positioning phase.

9. The disk drive of claim 7 wherein the act of receiving servo signals during a second positioning phase comprises commencing said second positioning phase when the head associated with surface B is within a predetermined number of data tracks from the target data track.

10. The disk drive of claim 7 wherein the act of receiving signals from the servo sectors on surface A during a first positioning phase comprises receiving signals from the servo fields in a first order, and the act of receiving signals from the servo sectors on surface B during a second positioning phase comprises receiving signals from the servo fields in a reverse order to said first order.

11. The disk drive of claim 10 wherein the discrete blocks in each servo sector are arranged in angularly spaced fields including an automatic gain control (AGC) field, a sector identification (SID) field, a track identification field (TID), and a servo position error signal (PES) field and wherein the step of receiving signals from the servo fields on surface A in a first order comprises receiving signals from the servo fields in the order of AGC, SID, TID and PES.

12. A method for operating a magnetic recording disk drive, the disk drive having:
- at least one rotatable magnetic recording disk having a front generally planar surface, a back generally planar surface opposite the front disk surface, and a central axis of rotation perpendicular to said surfaces, each disk comprising a plurality of generally concentric circular data tracks of magnetic material on each of said surfaces, the data tracks being centered about said axis; a plurality of servo sectors on the front surface and forming a pattern of generally arcuate lines extending in a generally radial direction across said data tracks between radially inner and outer circles centered at said axis, each servo sector comprising a plurality of discrete blocks of magnetic material, the blocks being arranged in angularly spaced fields along the data tracks; and a plurality of servo sectors on the back surface forming a pattern identical to the pattern on said front surface; the tracks on the disks being aligned into radially-spaced cylinders;
- at least one first head, each first head associated with a front surface of a disk for reading and writing to data tracks and for detecting servo sectors on the front surface of a disk;
- at least one second head, each second head associated with a back surface of a disk for reading and writing to data tracks and for detecting servo sectors on the back surface of a disk;
- an actuator connected to the heads for positioning the heads to different data tracks and maintaining the heads on the data tracks, the actuator causing the first and second heads to follow a generally arcuate path across said disk surfaces that is substantially identical to the arcuate line of servo sectors on a front surface of a disk; and
- a servo control system coupled to the heads and the actuator the servo control system including a processor for generating an actuator control signal in response to detection of the servo fields by the heads;

the method comprising the processor-implemented steps of:
- in response to a request to read or write to a data track on a back surface of a disk, before causing the actuator to seek from a first cylinder to a second cylinder containing the requested data track, determining if the seek length to the requested data track is greater than a predetermined number of data tracks; and
- if the seek length is greater than said predetermined number then during a first phase of said seek receiving signals from the servo sectors on a front surface of a disk and during a second phase of said seek receiving signals from the servo sectors on a back surface of a disk.

* * * * *